(12) United States Patent
Morio et al.

(10) Patent No.: US 7,958,976 B2
(45) Date of Patent: Jun. 14, 2011

(54) PAD CLIP FOR DISC BRAKE

(75) Inventors: Takefumi Morio, Tokyo (JP); Takaaki Sasaki, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 970 days.

(21) Appl. No.: 11/819,049

(22) Filed: Jun. 25, 2007

(65) Prior Publication Data

US 2008/0006489 A1    Jan. 10, 2008

(30) Foreign Application Priority Data

Jun. 26, 2006   (JP) .............................. P.2006-174780

(51) Int. Cl.
*F16D 65/40* (2006.01)
(52) U.S. Cl. ................................. 188/73.38; 188/205 A
(58) Field of Classification Search ............... 188/73.38, 188/73.31, 73.35, 73.36, 73.37, 205 A
See application file for complete search history.

(56) References Cited

U.S. PATENT DOCUMENTS

| | | | | |
|---|---|---|---|---|
| 3,980,160 A | * | 9/1976 | Hoffmann et al. | 188/73.38 |
| 4,219,105 A | * | 8/1980 | Delaunay | 188/73.38 |
| 4,408,681 A | * | 10/1983 | Oshima | 188/73.38 |
| 5,829,555 A | * | 11/1998 | Anda et al. | 188/73.38 |
| 5,947,234 A | * | 9/1999 | Shimazaki | 188/73.36 |
| 2003/0042085 A1 | * | 3/2003 | Kang | 188/73.38 |

FOREIGN PATENT DOCUMENTS

| | | | |
|---|---|---|---|
| GB | 2004958 A | * | 4/1979 |
| JP | 57-139740 | | 9/1982 |
| JP | 63-35827 | | 3/1988 |
| JP | 2-96042 | | 7/1990 |
| JP | 9-89018 | | 3/1997 |
| JP | 9-296836 | | 11/1997 |
| JP | 2000-145840 | | 5/2000 |
| JP | 2001-20982 | | 1/2001 |
| JP | 2005-121174 | | 5/2005 |

* cited by examiner

*Primary Examiner* — Xuan Lan Nguyen
(74) *Attorney, Agent, or Firm* — Drinker Biddle & Reath LLP

(57) ABSTRACT

The pad clip 14*d* is arranged between pins 12, 12 made to bridge an outer body portion and an inner body portion constituting a caliper and the two pads 10*b*, 11*b*. An engaging plate portion 27 is engaged with the respective pins 12, 12 without play. Press pieces 28, 28 formed by folding to bend both end portions in a rotational direction of the engaging plate portion in directions in which the more proximate to the two pads 10*b*, 11*b*, the more directed to an outer side in a radial direction are brought into elastic contact with outer peripheral edges of both end portions in a rotational direction of pressure plates 13*b*, 13*b* of the two pads 10*b*, 11*b*. Thereby, amounts of projecting portions in correspondence with the respective press pieces 28, 28 in a state of a material plate before being folded to bend from the engaging plate portion 27 can be restrained.

1 Claim, 9 Drawing Sheets

FIG. 10 (A) Prior Art
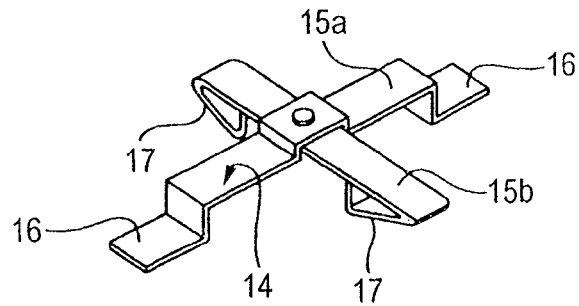
FIG. 10 (B) Prior Art
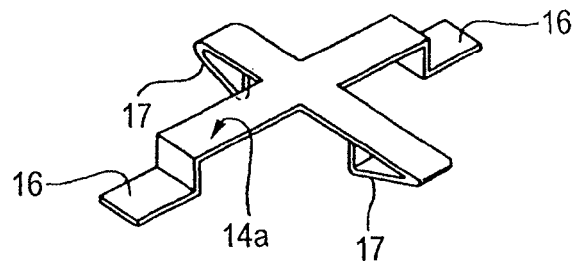
FIG. 10 (C) Prior Art
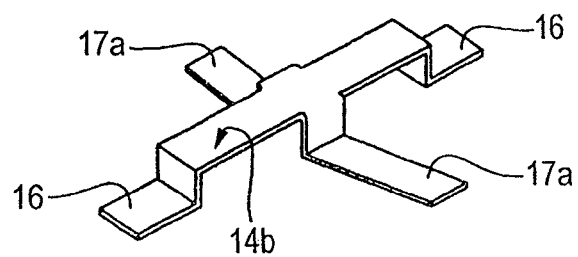

PAD CLIP FOR DISC BRAKE

This application claims foreign priority from Japanese Patent Application No. 2006-174780, filed on Jun. 26, 2006, the entire contents of which are hereby incorporated by reference.

BACKGROUND OF THE INVENTION

1. Field of the Invention

The present invention relates to a pad clip, used in a disc brake of a vehicle, for preventing a pad from being rattled in non braking time and pulling the pad apart from a side face of a rotor in accordance with releasing braking.

2. Related Art

A disc brake is widely used for braking a vehicle. In braking by the disc brake, a pair of pads arranged on both sides in an axial direction of a rotor rotated along with a wheel is pressed to both side faces of the rotor by pistons. Although there are known such disc brakes having various structures in a background art, an opposed piston type disc brake provided with pistons on both sides of the rotor in a state of being opposed to each other achieves a stable brake force. Therefore, in recent years, examples of use of the opposed piston type disc brake are increased. JP-A-09-089018 and JP-A-2005-121174 respectively describe examples of such an opposed piston type disc brake.

FIGS. 8 through 10(C) show a structure described in JP-A-09-089018. A disc brake 1 is provided with a caliper 5 provided with an outer body portion 3 and an inner body portion 4 at a position interposing a rotor 2, and an outer cylinder 6 and an inner cylinder 7 are provided in the respective body portions 3, 4 in a state of making opening portions of the respectives opposed to each other by way of the rotor 2. Further, an outer piston 8 and an inner piston 9 are mounted into the outer cylinder 6 and the inner cylinder 7 in liquid tight and displaceably in an axial direction of the rotor 2 (up and down direction of FIGS. 1, 5, 8 and 11, obverse and reverse direction of FIGS. 2, 6 and 12, left and right direction of FIGS. 3, 7, 10(A), 10(B), 10(C) and 13). Further, an outer pad 10 and an inner pad 11 are arranged so as to be displaceable in the axial direction of the rotor 2 at portions proximate to outer sides in a radial direction of an outer peripheral edge of the rotor 2 in a state of being respectively hung from pins 12, 12 made to bridge the outer body portion 3 and the inner body portion 4. Through holes are respectively formed at outer peripheral edge portions of pressure plates 13, 13 of the two pads 10, 11, and the respective pins 12, 12 are loosely inserted into the respective through holes.

A pad clip 14 is arranged between the respective pins 12, 12 and the outer pad 10 and the inner pad 11. As shown by FIG. 10 (A), the pad clip 14 is constituted by coupling two sheets of metal plates 15a, 15b respectively having an elasticity in a state of being intersected with each other. The metal plate 15a is arranged in parallel with a rotational direction of the rotor 2 (left and right direction of FIGS. 1, 2, 5, 6, 8, 11 and 12) between the two pads 10, 11. In contrast thereto, the metal plate 15b is arranged in parallel with the axial direction of the rotor 2 substantially at a center portion in the rotational direction of the rotor 2 of the two pads 10, 11.

Further, both end portions of the metal plate 15a in the rotational direction of the rotor 2 are constituted by fold-to-bend portions 16, 16 folded to bend to an inner side in the radial direction respectively in a crank-like shape, and the two fold-to-bend portions 16, 16 are engaged with peripheral faces on the inner side in the radial direction of the respective pins 12, 12. Further, both end portions in the axial direction of the rotor 2 of the metal plate 15b on other side are respectively folded back to inner sides to constitute elastic engaging portions 17, 17. Further, inner side faces in the radial direction of the two elastic engaging portions 17, 17 are brought into elastic contact with outer peripheral edge portions and substantially at center portions in the rotational direction of the rotor 2 of the pressure plates 13, 13 of the two pads 10, 11.

According to the disc brake 1 constituted as described above, during braking, a pressurized oil is fed into the outer cylinder 6 and the inner cylinder 7 to press linings 24, 24 of the outer pad 10 and the inner pad 11 to two inner and outer side faces of the rotor 2 by the outer piston 8 and the inner piston 9. Further, in accordance with releasing braking, the two pads 10, 11 are pulled apart from the side faces of the rotor 2 by elastic forces exerted from the two elastic engaging portions 17, 17 constituting the pad clip 14. On the other hand, during non braking time, by the two elastic engaging portions 17, 17, elastic forces directed to the inner side in the radial direction are exerted to the two pads 10, 11 to prevent the two pads 10, 11 from being rattled relative to the caliper 5.

Further, JP-A-09-089018 mentioned above also respectively describes a pad clip 14a formed by a single sheet of a metal plate as shown by FIG. 10 (B), and a pad clip 14b forming elastic engaging portions 17a, 17a constituting portions of elastically pressing the two pads 10, 11 by folding to bend the elastic engaging portions 17a, 17a in directions in which the more proceeding to front end portions thereof, the more directed to outer sides in the radial direction without folding back the elastic engaging portions 17a, 17a.

In a case of the structure described in JP-A-09-089018 mentioned above, by the pad clips 14, 14a, 14b, only the center portions in the rotational direction of the outer pad 10, the inner pad 11 are pressed. Therefore, there is a possibility that attitudes of the two pads 10, 11 are difficult to be stabilized, the two pads 10, 11 are locally brought into contact with the rotor 2, and uneven wear is brought about at the linings 24, 24 constituting the two pads 10, 11. Further, in the pad clips 14, 14a, 14b, the pad clip 14 shown in FIG. 10(A) needs to couple two sheets of the metal plates 15a, 15b, and therefore, fabrication cost is increased.

On the other hand, in cases of the pad clips 14a, 14b shown in FIGS. 10(B) and 10(C), although the pad clips 14a, 14b are formed by one sheet of a metal plate, it is necessary to constitute a material plate before being folded to bend to form by a cross shape. Such a material plate is provided by successively punching a metal plate constituting a material by a predetermined shape. Therefore, it is requested to make the interval between the contiguous material plates as narrow as possible. However, in a case of the material plate in the cross shape as described above, the interval between the contiguous material plates becomes wide. As a result, an unused portion of the metal plate constituting the material is increased (blanking performance is not good=yield of material is poor). Further, in the case of the pad clip 14a shown in FIG. 10(B), the elastic engaging portions 17, 17 are formed by being folded back. Therefore, a dimension of the material plate before being folded back is increased, and the blanking performance (yield) is further deteriorated.

On the other hand, JP-A-2005-121174 describes a structure capable of stabilizing attitudes of an outer pad and an inner pad. FIGS. 11 through 13 show a disc brake 1a described in JP-A-2005-121174. The disc brake 1a is provided with a caliper 5a arranged in a state of riding over the rotor 2 rotated along with a wheel. The caliper 5a is integrally produced by a material made of an aluminum alloy and includes an outer body portion 3a and an inner body portion 4a arranged on both sides in the axial direction of the rotor 2, and a pair of connecting portions 18, 18 connecting both end portions in a rotational direction of the two body portions 3a, 4a.

A pair of outer side coupling pins 19, 19 are provided at portions of middle portions in a rotational direction of the outer body portion 3a and the inner body portion 4a disposed between the two connecting portions 18, 18, between outer end portions in a radial direction respectively in a state of being made to bridge the two body portions 3a, 4a. Further, one piece of a middle coupling pin 20 is provided in a state of being made to bridge the two body portions 3a, 4a. The respective coupling pins 19, 20 are constituted by a circular tube shape by a ferrous alloy constituting a metal material having a Young's ratio larger than that of the aluminum alloy respectively constituting the caliper 5a.

The two outer side coupling pins 19, 19 in the respective coupling pins 19, 20 respectively having such shapes are provided at portions proximate to outer sides in the radial direction of an outer peripheral edge of the rotor 2 at positions interposing pressure plates 13a, 13a of an outer pad 10a and an inner pad 11a. Further, the middle coupling pin 20 is provided at portions on outer sides in the radial direction of the two pads 10a, 11a and between the outer side coupling pins 19, 19. Further, a pad clip 14c is provided between the middle coupling pin 20 of the respective pins 19, 20 and outer peripheral edges in the radial direction of the pressure plates 13a of the two pads 10a, 11a.

The pad clip 14c is made of an elastic material of a stainless spring steel plate or the like and is provided with a center engaging portion 21 and press arm portions 22, 22 respectively constituted by a T-like shape provided on both sides in a rotational direction of the center engaging portion 21. The center engaging portion 21 there among is provided with a section in a shape of a circular arc an outer side in the radial direction of which is constituted by a recess face such that the pad clip 14c is stabilized in the radial direction and the rotational direction in a state of being brought into contact with an inner half side in the radial direction of the middle coupling pin 20. Further, the center engaging portion 21 is proximate to inner wall portions 23, 23 of the two body portions 3a, 4a in the axial direction of the rotor 2 to achieve to position the pad clip 14c in the axial direction.

In contrast thereto, respective front half portions of the respective press arm portions 22, 22 are folded back to inner sides as shown by FIG. 13 to constitute elastic engaging portions 17, 17 and the respective elastic engaging portions 17, 17 are brought into contact with inner end edges proximate to the rotor 2 of outer peripheral edges in the radial direction of the pressure plates 13a, 13a. By the constitution, the two pressure plates 13a, 13a are exerted with the elastic force directed to an inner side in the radial direction and an elastic force in the direction of being separated from each other. Further, independent locking pins 36, 36 are provided for the two respective body portions 3a, 4a at portions proximate to inner sides in the radial direction of the outer body portion 3a and the inner body portion 4a. Further, portions of outer peripheral faces of the respective locking pins 36, 36 are brought into contact with inner end edges in the radial direction of either pressure plate 13a of the pressure plates 13a, 13a of the two pads 10a, 11a based on the elastic force of the pad clip 14c.

In the case of a structure described in JP-A-2005-121174 mentioned above, by pertinently arranging the respective outer side, middle coupling pins 19, 20, the pad clip 14c, the respective locking pins 36, 36, the attitudes of the two pads 10a, 11a can be stabilized regardless of non braking time, braking time. That is, in non braking time, the press arm portions 22, 22 of the pad clip 14c provided between the middle coupling pin 20 and the outer peripheral edges proximate to the both ends in the rotational direction of the pressure plates 13a, 13a constituting the two pads 10a, 11a presses the inner peripheral edges in the radial direction of the two pressure plates 13a, 13a to the respective locking pins 36, 36. Therefore, the two pads 10a, 11a are not rattled by vibration or the like in accordance with running. However, also in the case of the structure described in Patent Reference 2 mentioned above, similar to the structure shown in FIG. 10 (B), the pad clip 14c is formed by folding back the elastic engaging portions 17, 17, and therefore, a dimension of a material plate before being folded back is increased.

That is, the pad clip 14c includes the press arm portions 22, 22 on the both sides in the rotational direction of the center engaging portion 21, and the respective elastic engaging portions 17, 17 are projected from the end portions of the two press arm portions 22, 22 to the two pads 10a, 11a. Further, the respective elastic engaging portions 17, 17 are formed by being folded back, and therefore, amounts of projecting portions in correspondence with the respective elastic engaging portions 17, 17 from the two press arm portions 22, 22 in a state of a material plate before being folded back are increased. Therefore, in a state of the material plate of the pad clip 14c, by presence of the center engaging portion 21 and the two press arm portions 22, 22, a dimension in the rotational direction of the rotor 2 is increased, the amounts of projecting the portions in correspondence with the respective elastic engaging portions 17, 17 are increased, thereby, also a dimension in the axial direction of the rotor 2 is increased. Therefore, in punching a material plate from a metal plate constituting a material, it is unavoidable that the interval between contiguous material plates is increased, and the blanking performance (yield) is deteriorated.

SUMMARY OF THE INVENTION

One or more embodiments of the present invention provide a pad clip which can stabilize attitudes of an outer pad and an inner pad and is inexpensive and excellent in a blanking performance (yield of material).

In accordance with one or more embodiments of the present invention, a pad clip for a disc brake is formed by bending a single sheet of a metal plate having an elasticity and provided with an engaging plate portion and a plurality (four pieces) of press pieces.

The engaging plate portion thereamong is engaged with a pin provided in a state of being made to bridge an outer body portion and an inner body portion provided by interposing a rotor rotated along with a wheel.

Further, the respective press pieces are respectively provided at both end portions in a rotational direction of the rotor of the engaging plate portion. Under the state, the respective press pieces are respectively brought into elastic contact with both end portions in a rotational direction and an outer peripheral edge in a radial direction of the rotor of an outer pad and an inner pad respectively supported by the outer body portion and the inner body portion displaceably in an axial direction of the rotor. Further, the respective press pieces exert an elastic force directed to an inner side in the radial direction and an elastic force in a direction of being separated from each other to the two pads.

Particularly, the respective press pieces are formed by being folded to bend from the both end portion of the engaging plate portion in directions in which the more proximate to the two pads, the more directed to the outer side.

Further, in the specification and claims, 'rotational direction' refers to the rotational direction (=circumferential direction) of the rotor, similarly, 'axial direction' refers to the axial direction of the rotor, similarly, 'radial direction' refers to the radius direction of the rotor unless specified otherwise.

Further, the both end portions of the respective press pieces in the rotational direction of the rotor may be folded to bend in directions in which the more remote from a center portion, the more directed to the outer side in the radial direction.

Further, the respective press pieces may be bent to project to the inner side in the radial direction at a center portion in the rotational direction of the rotor.

According to the pad clip for the disc brake as described above, there is provided a structure which can stabilize attitudes of the outer pad and the inner pad and is inexpensive and excellent in blanking performance (yield of material). That is, the two pads can stabilize the attitudes regardless of braking time, non braking time since the both end portions in the rotational direction are elastically pressed by the respective press pieces. Further, the pad clip is formed by bending a single sheet of a metal plate, and therefore, the pad clip can be produced more inexpensively than a structure of coupling two sheets of metals as shown by FIG. 10 (A).

Further, the respective press pieces are formed by being folded to bend from the both end portions of the engaging plate portion in the directions in which the more proximate to the two pads, the more directed to the outer side in the radial direction. Whereas the engaging plate portion is prolonged in the rotational direction of the rotor in order to arrange the respective press pieces provided at the both end portions to the both end sides in the rotational direction of the two pads, the respective press pieces are projected from the engaging plate portion in the axial direction of the rotor. Therefore, when amounts of projecting portions in correspondence with the respective press pieces in a state of a material plate from the engaging plate portion is large, in successively punching the material plate of the pad clip from one sheet of a metal plate, an interval between the contiguous material plates is widened and the blanking performance is deteriorated.

In contrast thereto, in the case of the example, the respective press pieces are formed by being folded to bend from the both end portions of the engaging plate portion, and therefore, in comparison with a structure of folding back a front half portion as an elastic engaging portion as shown by FIG. 10 (B) and FIG. 13, amounts of projecting portions in correspondence with the respective press pieces in the state of the material plate can be reduced and the blanking performance can be improved.

Further, if the both end portions in the rotational direction of the rotor of the respective press pieces are folded to bend in directions in which the more remote from the center portion, the more directed to the outer sides in the radial direction, rigidities of the respective press pieces can be ensured, and a sliding resistance accompanied by displacements in the axial direction of the rotor of the two pads can be restrained by reducing areas of portions thereof brought into contact with the two pads. Thereby, the attitudes of the two pads can further be stabilized.

Further, it is preferable to reduce an area of the contact portion (preferably, near to point contact) in order to stabilize the state of bringing the respective press pieces and end edges of the two pads into contact with each other without one side contact regardless of a behavior of the two pads, progress of wear of linings constituting the two pads or occurrence of uneven wear. Therefore, the area of the contact portion can further be reduced, if the respective press pieces are bent to project to the inner side in the radial direction at the center portion in the rotational direction of the rotor.

Other aspects and advantages of the invention will be apparent from the following description and the appended claims.

BRIEF DESCRIPTION OF THE DRAWINGS

FIGS. 10(A) to 10(C) illustrate perspective views showing three examples of pad clips integrated to the first example of the background art structure.

DETAILED DESCRIPTION OF THE EXEMPLARY EMBODIMENTS

Although the invention will be described with respect to exemplary embodiment and variations thereof, the following exemplary embodiment and variations thereof do not limit the invention.

First Exemplary Embodiment

Figure 8:
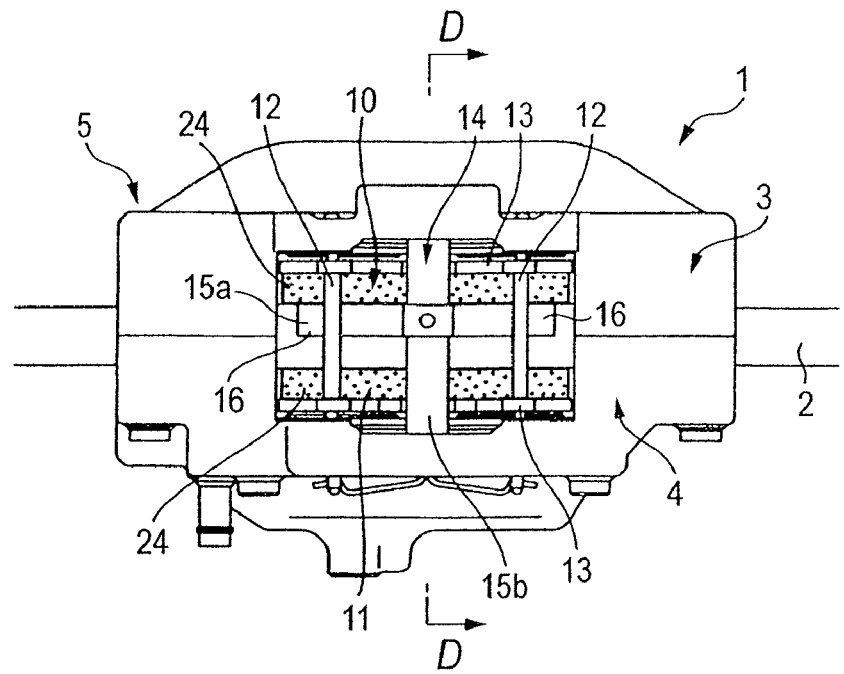
FIG. 8 is a plane view of a disc brake showing a first example of a background art structure.
Figure 9:
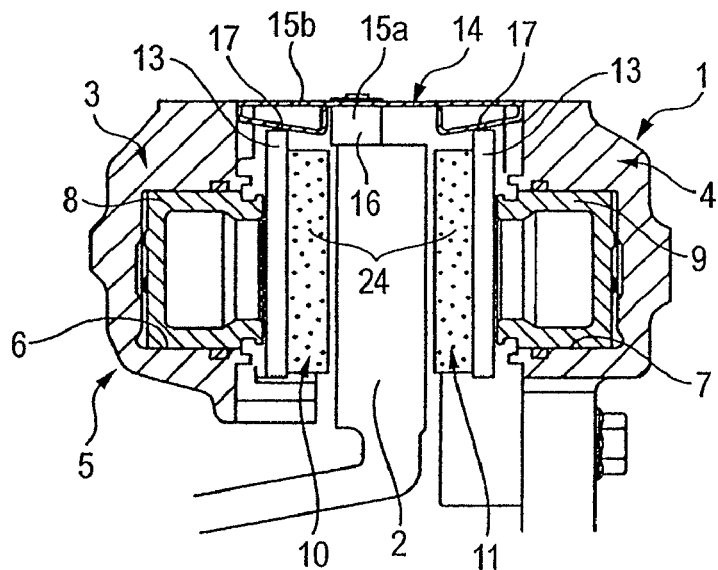
FIG. 9 is a sectional view taken along a line D-D of FIG. 8.

FIG. 1 through FIG. 4 show a first exemplary embodiment of the invention. Illustration and explanation of duplicated portions with the background art structures shown in FIG. 8, 9 are omitted or simplified and an explanation will be mainly given to a characteristic portion of the exemplary embodiments as follows.

In the first exemplary embodiment, respective two portions of projected portions 25, 25 projected to an outer side in a radial direction of the rotor 2 (refer to FIG. 8, 9, 11, 12) are formed at outer peripheral edges of middle portions in a rotational direction of pressure plates 13b, 13b constituting the outer pad 10b and the inner pad 11b. Further, through holes 26, 26 are respectively formed at the respective projected portions 25, 25. Further, at a portion proximate to an outer side in the radial direction of the outer peripheral edge of the rotor 2, pins 12, 12 constituting a caliper, not illustrated, and provided in a state of being made to bridge an outer body portion and an inner body portion are loosely inserted through the respective through holes 26, 26. Thereby, the two pads 10b, 11b are supported displaceably in the axial direction of the rotor 2 in a state of being hung from the respective pins 12, 12.

Further, the pad clip 14d is provided between the respective pins 12, 12 and outer peripheral edges in the radial direction of the two pads 10b, 11b. The pad clip 14d is constituted by bending to fold one sheet of a metal plate made of an elastic material of a stainless spring steel plate or the like and includes an engaging plate portion 27 and 4 pieces of press pieces 28, 28. The engaging plate portion 27 thereamong is arranged between the two pads 10b, 11b and is engaged with the respective pins 12, 12. Therefore, a center portion in the rotational direction of the rotor 2 and a portion between the respective pins 12, 12 of the engaging plate portion 27 is constituted by a projected portion 29 projected to an outer side of the radial direction. The projected portion 29 makes a width in the rotational direction of the projected portion 29 elastically expandable/contractable by bending a center portion thereof.

Further, two side faces in the rotational direction of the projected portion 29 are constituted by inclined portions 30, 30 which are inclined in directions in which the more proceeding to the outer side in the radial direction, the more proximate to each other. Therefore, the more proceeding to the outer side in the radial direction, the narrower the width in the rotational direction of the projected portion 29. Further, arm portions 31, 31 arranged on both sides in the rotational direction of the projected portion 29 and portions 32, 32 continuous to the two inclined portions 30, 30 are formed in a shape of a circular arc in sections thereof having radii of curvature the same as outer diameters of the respective pins 12, 12 or slightly larger than the outer diameters. Further, front end portions of the arm portions 31, 31 are folded to bend in a crank-like shape to the inner side in the radial direction to provide the press pieces 28, 28 on both sides in the axial direction of the front end portions.

Figure 4:
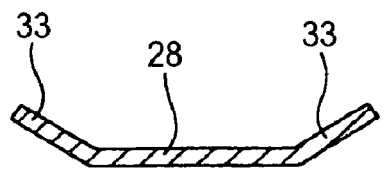
FIG. 4 is an enlarged sectional view taken along a line B-B of FIG. 1 shown by omitting a part thereof.

The respective press pieces 28, 28 are formed to respectively project from front end portions of the arm portions 31, 31 of the engaging plate portion 27 to the outer pad 10b and the inner pad 11b. Further, the respective press pieces 28, 28 are formed by being folded to bend in directions in which the more proximate to the two pads 10b, 11b, the more folded to bend in directions directed to outer sides in the radial direction. Further, as shown by FIG. 4, both end portions in the rotational direction of the rotor 2 of middle portions through front end portions of the respective press pieces 28, 28 are constituted by fold-to-bend portions 33, 33 folded to bend in directions in which the more remote from the center portion, the more directed to outer side in the radial direction.

When the pad clip 14d constituted as described above is arranged between the respective pins 12, 12 and the two pads 10b, 11b, the projected portion 29 of the engaging plate portion 27 is made to advance from the inner side in the radial direction to between the respective pins 12, 12. The two side faces of the projected portion 29 is constituted by the two inclined portions 30, 30, and therefore, the projected portion 29 can smoothly be made to advance to between the respective pins 12, 12. Further, in a state in which the projected portion 29 is made to advance to a depth side (until the respective pins 12, 12 and the continuous portions 32, 32 are brought into contact with each other), the projected portion 29 is elastically deformed in a direction of contracting the width in the rotational direction. The elastic deformation is smoothly carried out by bending the projected portion 29. As a result, the two inclined portions 30, 30 are brought into elastic contact with outer peripheral faces of the respective pins 12, 12, and the projected portion 29 is engaged with between the respective pins 12, 12 without play. Further, the continuous portions 32, 32 are constituted by the shape of the circular arc in the section having the diameter the same as or slightly larger than the outer diameter of the respective pins 12, 12, and therefore, in the state of making the projected portion 29 advance to the depth sides of the respective pins 12, 12, contact areas of the continuous portions 32, 32 and the respective pins 12, 12 can be increased, and the projected portion 29 and the respective pins 12, 12 can further firmly be engaged with each other.

Figure 1:
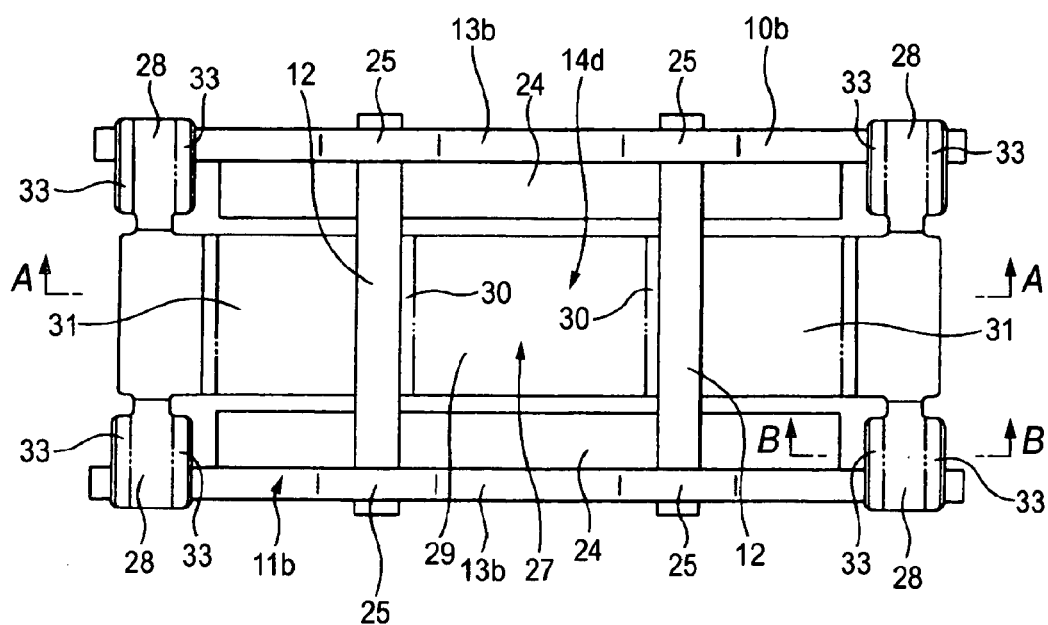
FIG. 1 is a view showing a state of arranging a pad clip between an outer pad and an inner pad and a pin from an outer diameter side, according to a first exemplary embodiment of the invention.
Figure 2:
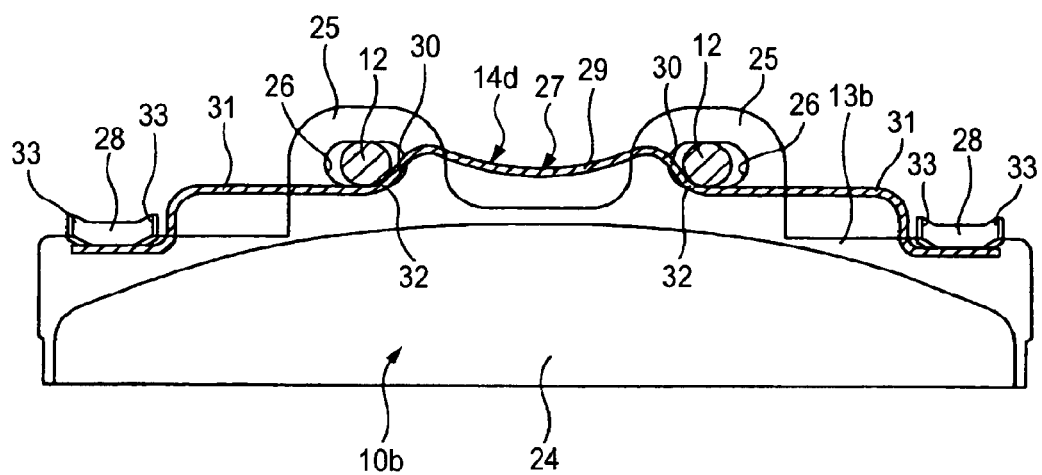
FIG. 2 is a sectional view taken along a line A-A of FIG. 1 shown by omitting a part thereof.
Figure 3:
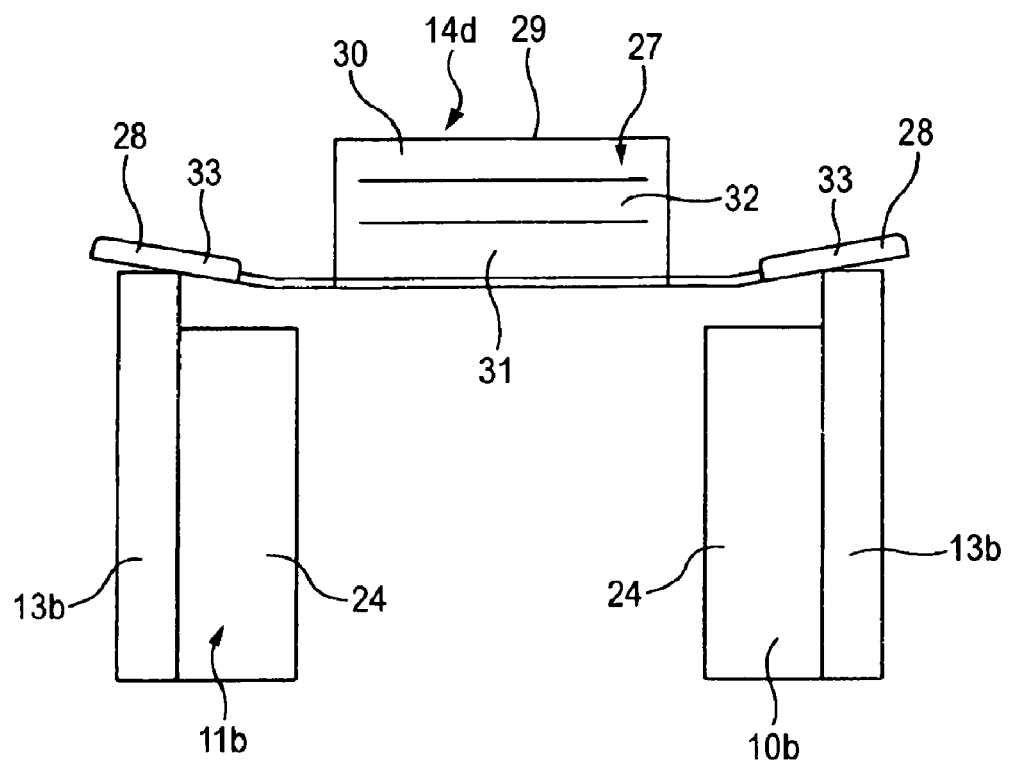
FIG. 3 is a view viewed from a side direction of FIG. 1 shown by taking out only the pad clip and the two pads.

In the state of engaging the projected portion 29 and the respective pins 12, 12 to each other as described above, the respective press pieces 28, 28 provided at the front end portions of the arm portions 31, 31 are respectively brought into elastic contact with both end portions in the rotational direction and the outer peripheral edge portions in the radial direction of the pressure plates 13b, 13b constituting the outer pad 10b and the inner pad 11b. Further, the two pads 10b, 11b are exerted with the elastic force directed to the inner side in the radial direction and the elastic force in the direction of being separated from each other. That is, as shown by FIG. 3, base end portions of the respective press pieces 28, 28 are disposed to the inner side in the radial direction of the outer peripheral edges of the both end portions in the rotational direction of the pressure plates 13b, 13b.

Further, inner side faces in the radial direction of the respective press pieces 28, 28 are brought into elastic contact with outer peripheral edges of both end portions in the rotational direction and peripheral edge portions on the center side in the axial direction of the two pressure plates 13b, 13b. As a result, by elastic recovery forces of the respective press pieces 28, 28, the two pads 10b, 11b are pressed to the inner side in the radial direction and in directions of being separated from each other.

In the first exemplary embodiment as described above, attitudes of the two pads 10b, 11b can be stabilized regardless of non braking time, braking time. That is, in non braking time, the press pieces 28, 28 of the pad clip 14d provided between the pins 12, 12 and both end portions in the rotational direction and the outer peripheral edges in the radial direction of the pressure plates 13b, 13b constituting the two pads 10b, 11b press the both end portions in the rotational direction of the two pressure plates 13b, 13b to the inner side in the radial direction. Therefore, the two pads 10b, 11b can be prevented from being rattled or inclined by vibration or the like in accordance with running. Further, even when the two pads 10b, 11b are pressed in directions of being separated from each other by the respective press pieces 28, 28 in accordance with releasing braking, since the both end portions in the rotational direction of the two pressure plates 13b, 13b are pressed, the two pads 10b, 11b can be prevented from being rattled or inclined in being pressed. As a result, it can prevented to bring about strange sound, or uneven wear at the two linings by bringing the linings 24, 24 constituting the two pads 10b, 11b into sliding contact with side faces of the rotor 2 locally.

Further, in the first exemplary embodiment, the respective press pieces 28, 28 are formed by folding to bend front end portions of the arm portions 31, 31 constituting the engaging plate portion 27. Therefore, in comparison with structures of folding back the front half portions as an elastic engaging portion as shown by FIG. 10 (B) and FIG. 13, amounts of projecting portions in correspondence with the respective press pieces 28, 28 in a state of a material plate can be reduced, and a blanking performance (yield of a metal plate constituting a material) can be improved.

Further, in the first exemplary embodiment, the both end portions in the rotational direction of the respective press pieces 28, 28 are folded to bend in directions in which the more remote from the center portion the more directed to outer side in the radial direction to constitute the fold-to-bend portions 33, 33, and therefore, rigidities of the respective press pieces 28, 28 can be ensured. Further, along therewith, by reducing areas of portions thereof brought into contact with the two pads 10b, 11b, a sliding resistance in accordance with displacements in the axial direction of the rotor of the two pads 10b, 11b can be restrained. Thereby, the attitudes of the two pads 10b, 11b can be stabilized. Further, the pad clip 14d of the example is constituted by bending to form one sheet of a metal plate, and therefore, the pad clip 14d can be produced more inexpensively than the structure of coupling two sheets of metal plates as shown by FIG. 10 (A).

Second Exemplary Embodiment

Figure 5:
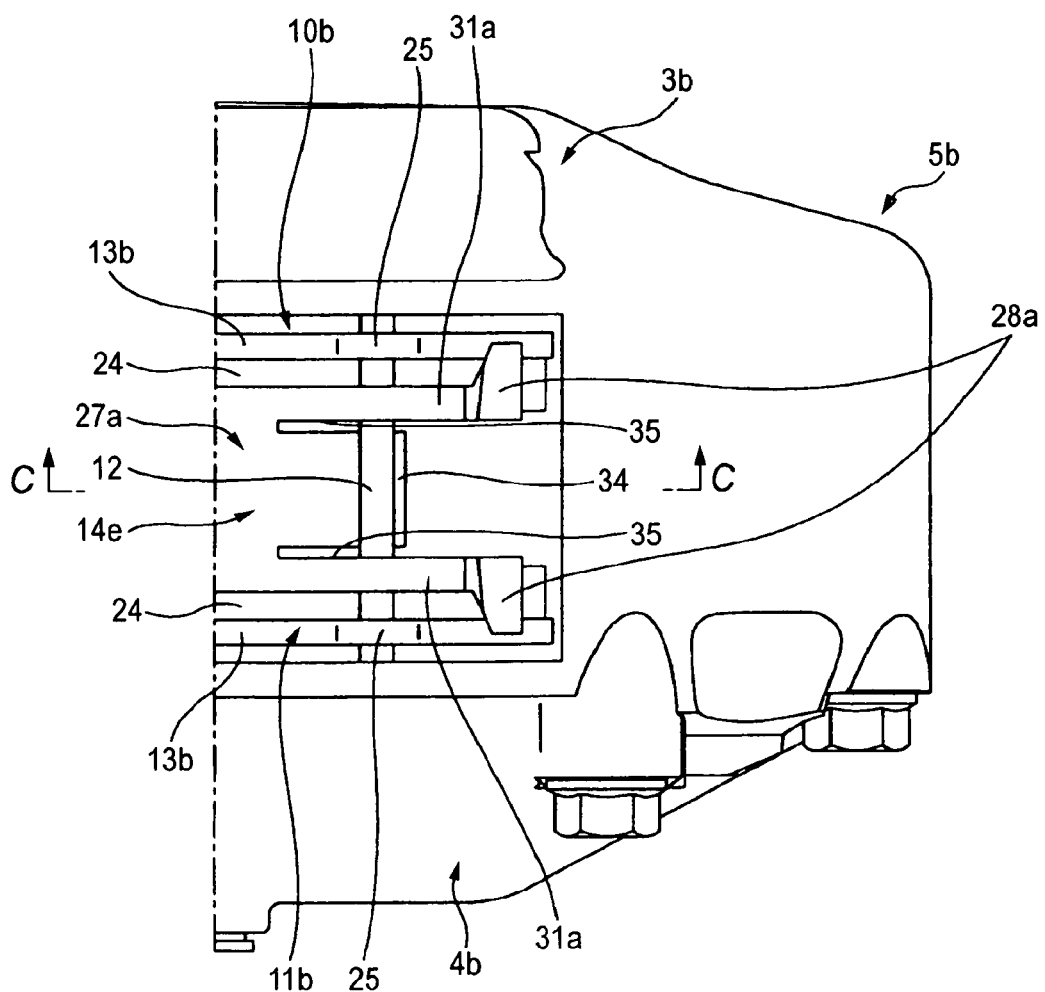
FIG. 5 is a view viewing a half portion of a state of integrating a pad clip to a disc brake from an outer diameter side, according to a second exemplary embodiment of the invention.
Figure 6:
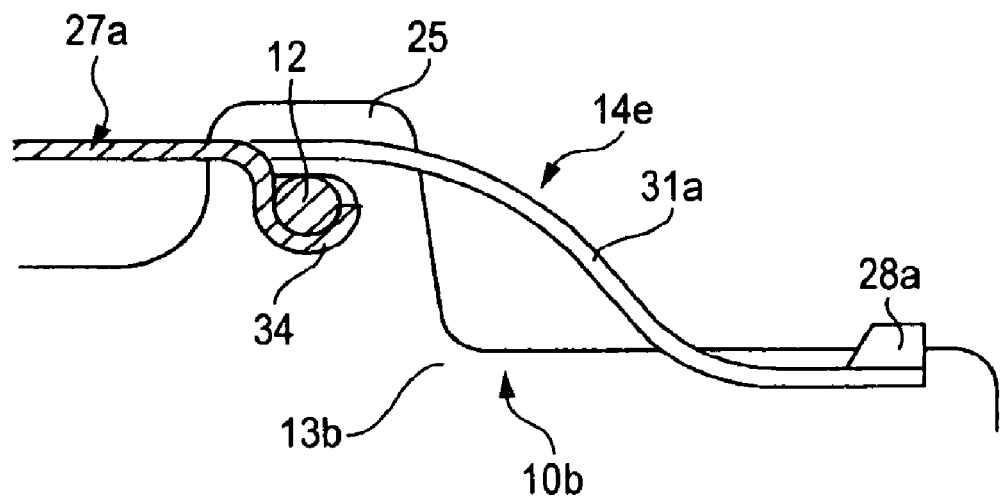
FIG. 6 is a sectional view taken along a line C-C of FIG. 5 shown by omitting a part thereof.
Figure 7:
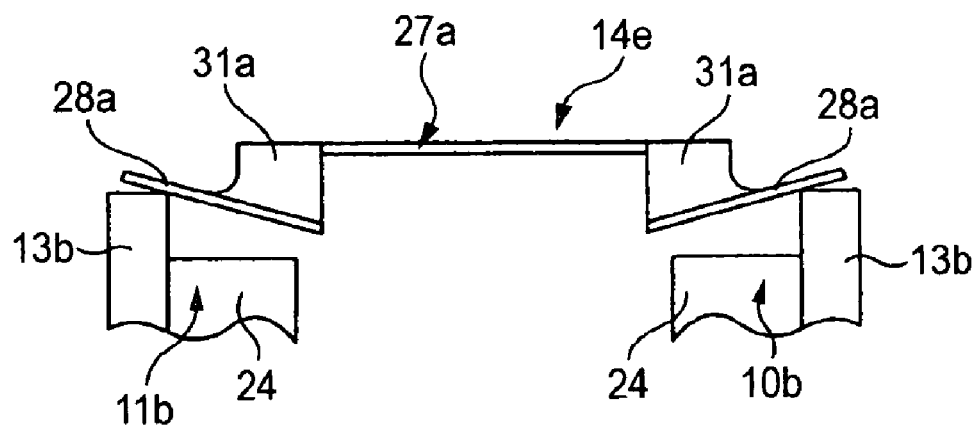
FIG. 7 is a view viewed from a right side of FIG. 5 shown by omitting a part thereof by taking out only the pad clip and two pads.

FIGS. 5 through 7 show a second exemplary embodiment of the invention. A pad clip 14e of the second exemplary embodiment is formed with arm portions 31a, 31a provided with press pieces 28a, 28a at front end portions thereof respectively at positions remote from each other in the axial direction of the rotor 2 (refer to FIG. 8, 9, 11, 12). That is, the arm portions 31a, 31a are constituted by both end portions in the axial directions of an engaging plate portion 27a and portions proximate to both ends in the rotational direction of the rotor 2 for engaging the pad clip 14e with the pin 12 made to bridge an outer body portion 3b and an inner body portion 4b constituting a caliper 5b. Further, locking hook portions 34 are respectively formed at a middle portion in the axial direction and both end portions in the rotational direction of the rotor 2 of the engaging plate portion 27a. Therefore, the respective locking hook portions 34 are arranged between the respective arm portions 31a, 31a in the axial direction.

The two locking hook portions 34 are formed by folding to bend the both end portions in the rotational direction of the middle portion in the axial direction of the engaging plate portion 27a to the inner side in the radial direction and folding back front end portions in a shape of a circular arc in sections thereof to the outer side in the radial direction. Radii of curvature of the inner peripheral faces of the two locking hook portions 34 in a free state are made to be slightly smaller than, for example, the outer diameter of the respective pins 12. Therefore, in a state of locking the two locking hook portions 34 by the respective pins 12, the inner peripheral faces of the two locking hook portions 34 and outer peripheral faces of the respective pins 12 are brought into elastic contact to firmly engage the two locking hook portions 34 with the respective pins 12. However, the radii of curvature in the free state may be made to be equal to or larger than the outer diameter of the respective pins 12.

On the other hand, the respective arm portions 31a, 31a are formed to ride over the respective pins 12. That is, as shown by FIG. 6, the respective arm portions 31a, 31a pass outer sides in the radial direction of the respective pins 12 and folded to bend to the inner side in the radial direction on both end sides of the outer pad 10a and the inner pad 11b. In the case of the example, notches 35, 35 are formed between the respective arm portions 31a, 31a and the locking hook portion 34 in order to lock the respective locking hook portions 34 by the respective pins 12 and form the respective arm portions 31a, 31a to ride over the respective pins 12 in this way.

Front end portions of the respective arm portions 31a, 31a are formed with the respective press pieces 28a, 28a to respectively project in the axial direction to the two pads 10b, 11b. That is, end portions of the respective press pieces 28a, 28a are projected in the axial direction more than the end edges sides of the two pads 10b, 11b of base end portions through middle portions of the respective arm portions 31a, 31a. Further, by folding to bend portions of connecting the front end portions of the respective arm portions and the base end portions through the middle portions of the respective press pieces 28a, 28a to twist, the respective press pieces 28a, 28a are inclined in directions in which the more proceeding to the two pads 10b, 11b, the more directed to the outer side in the radial direction. Further, inner side faces in the radial direction of the respective press pieces 28a, 28a are brought into elastic contact with peripheral edge portions on the center side in the axial directions of the outer peripheral faces of two end portions in the rotational directions of the pressure plates 13b, 13b constituting the two pads 10b, 11b.

When the pad clip 14e constituted as described above is arranged between the respective pins 12, 12 and the two pads 10b, 11b, the center portion of the engaging plate portion 27a is made to advance from the outer side in the radial direction to between the respective pins 12, 12 in a state of elastically contracting widths of the two locking hook portions 34 more than the interval between the respective pins 12, 12. Further, by releasing the force of contracting the widths of the two locking hook portions 34, the two locking hook portions 34 are brought into elastic contact with the respective pins 12, 12. In this way, in a state of locking the two locking hook portions 34 by the respective pins 12, 12, as described above, the respective press pieces 28a, 28a press the outer peripheral edges of the two end portions in the rotational direction of the two pads 10b, 11b. Further, when the pad clip 14e is detached, by pressing the two locking hook portions 34 to the inner side in the radial direction, engagement with the respective pins 12, 12 is disengaged. Further, by elastically contracting the widths of the two locking hook portions 34 more than the interval between the respective pins 12, 12, the center portion of the engaging plate portion 27a is pulled to draw to the outer side in the radial direction from between the respective pins 12, 12.

Also in the second exemplary embodiment as described above, a blanking performance of the material plate before being folded to bend can be improved. That is, the base end portions through the middle portions of the respective press pieces 28a, 28a are connected to the front end portions of the respective arm portions 31a, 31a arranged at both end portions in the axial direction of the engaging plate portion 27a. Therefore, amounts of projecting the respective press pieces 28a, 28a from end edges of the respective arm portions 31a, 31a can be reduced. Therefore, when the material plate is punched from a metal plate constituting a material, an unnecessary portion is reduced, and the blanking performance (yield) can be improved. Further, in the second exemplary embodiment, the pad clip 14e can be attached and detached to and from the outer side in the radial direction of the caliper 5b, and therefore, the operability is improved. Other structure and operation are similar to those of the first exemplary embodiment.

Third Exemplary Embodiment

Figure 11:
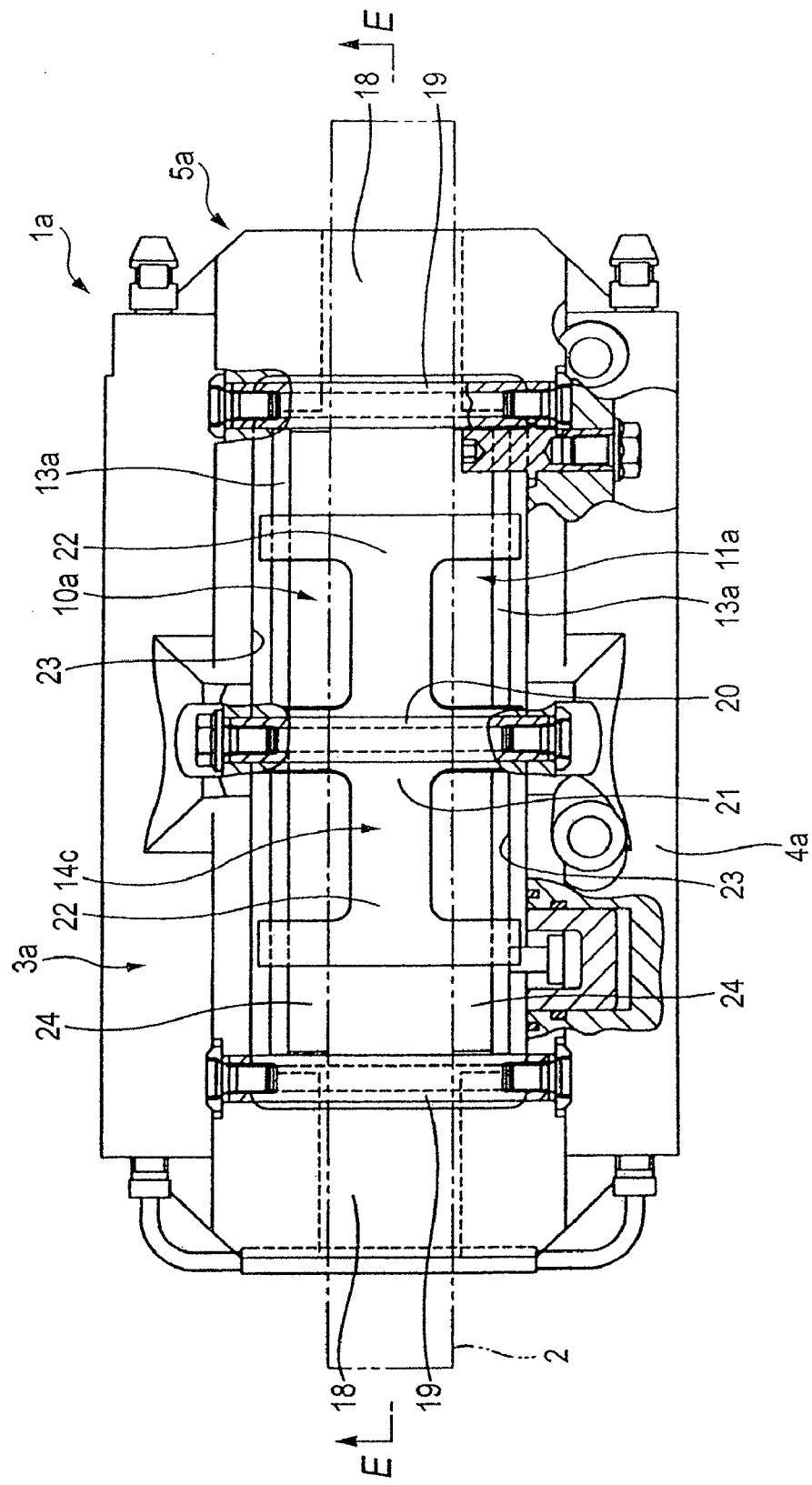
FIG. 11 is a partially cut plane view showing a second example of the background art structure.
Figure 12:
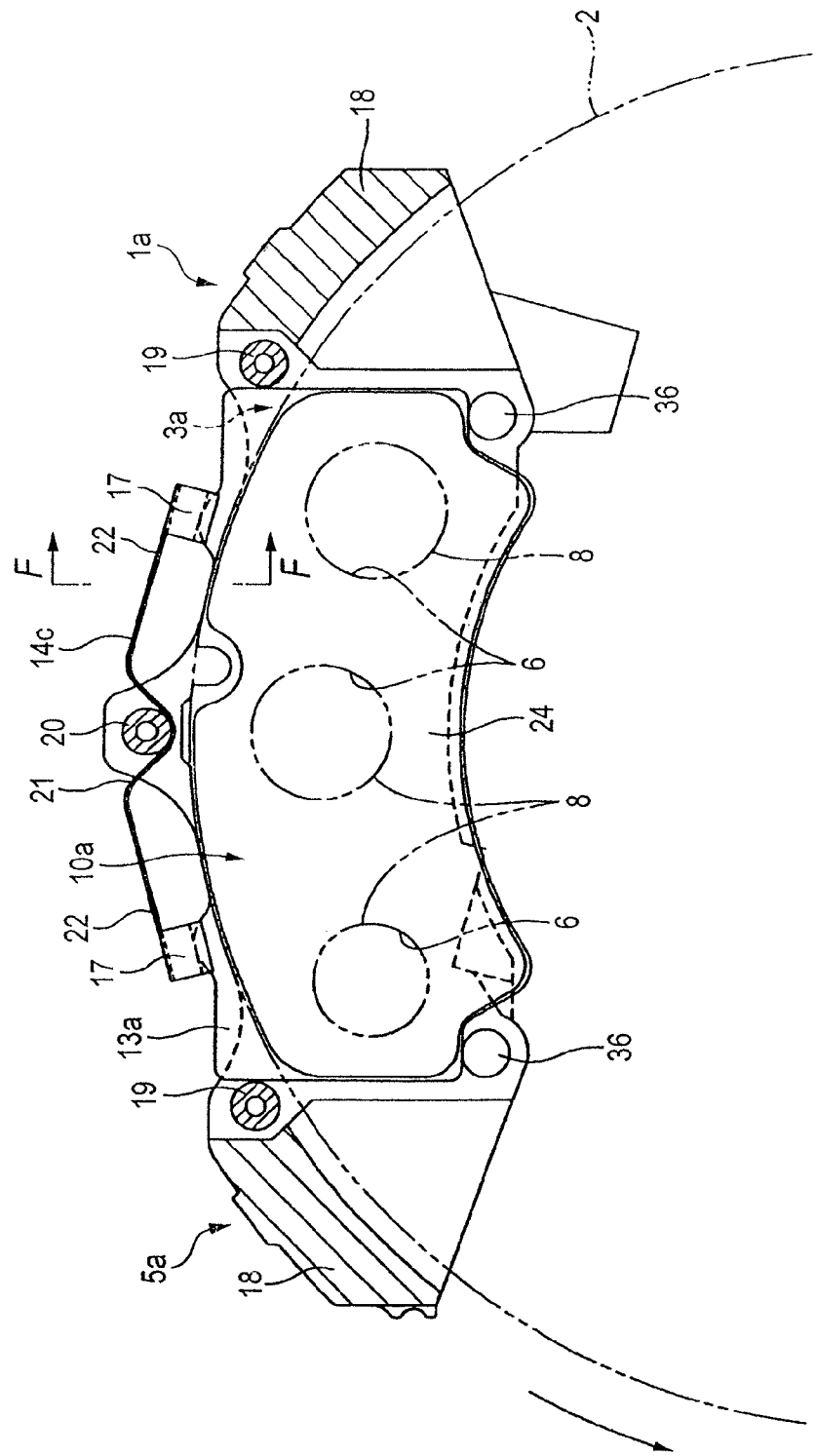
FIG. 12 is a sectional view taken along a line E-E of FIG. 11.
Figure 13:
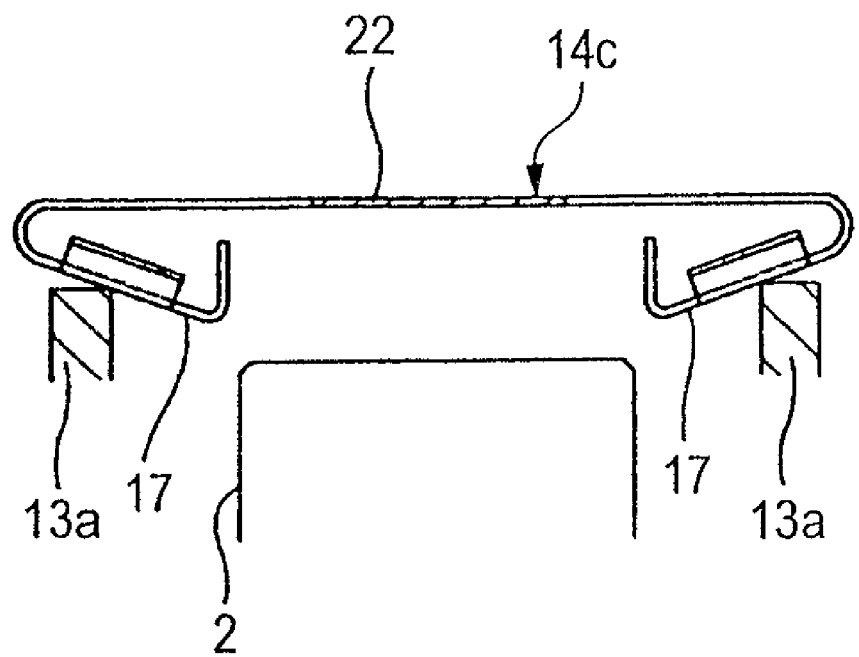
FIG. 13 is a sectional view taken along a line F-F of FIG. 12.

Although according to the above-described respective exemplary embodiments, an explanation has been given of a case of applying the invention to the structure of hanging the outer pad and the inner pad by the pin made to bridge the outer body portion and the inner body portion, the invention is applicable also to a structure of supporting the two pads 10a, 11a by support members of the locking pins 36, 36 or the like formed at the two body portions 3a, 4a as in the second example of the background art structure shown in FIGS. 11 through 13. Further, in order to stabilize a state of bringing the respective elastic pieces and the end edges of the pressure plates into contact with each other regardless of a behavior of the two pads, progress of wear of the linings or occurrence of uneven wear without one side contact, the respective press pieces may be bent to project to the inner side in the radial direction at the center portion in the rotational direction of the rotor.

While the invention has been described with reference to the exemplary embodiment and variations thereof, the technical scope of the invention is not restricted to the description of the exemplary embodiment and variations thereof. It is apparent to the skilled in the art that various changes or improvements can be made. It is apparent from the description of claims that the changed or improved configurations can also be included in the technical scope of the invention.

What is claimed is:

1. A pad clip for a disc brake comprising:

an engaging plate portion;

a locking hook portion provided on an end side of the engaging plate portion in a rotational direction of a rotor of the disc brake, and adapted to be engaged with a pin of the disc brake, wherein the pin bridges an outer body portion and an inner body portion of the disc brake provided by interposing the rotor;

arm portions provided on said end side of the engaging plate portion in said rotational direction at both sides of the locking hook portion in an axial direction of the rotor;

notches provided between the locking hook portion and the respective arm portions, and respectively extending in said rotational direction; and press pieces provided at end portions of the respective arm portions in said rotational direction, respectively adapted to be brought into elastic contact with end portions in said rotational direction and outer peripheral edges in a radial direction of an outer pad and an inner pad respectively supported by the outer body portion and the inner body portion displaceably in said axial direction, and exerting an elastic force directed to an inner side of the radial direction and an elastic force in a direction that the two pads are separated from each other, wherein the pad clip is formed from a single sheet of a metal plate, wherein the respective press pieces are formed by being folded to bend in directions in which the more proximate to the two pads, the more directed to an outer side in the radial direction, wherein the locking hook portion engages with an inner side in said radial direction of an outer peripheral surface of the pin, and wherein the arm portions pass an outer side in said radial direction of the pin to ride over the pin.

* * * * *